(12) United States Patent
Jeong et al.

(10) Patent No.: US 11,000,919 B2
(45) Date of Patent: May 11, 2021

(54) LASER PROCESSING APPARATUS

(71) Applicant: Samsung Display Co., Ltd., Yongin-si (KR)

(72) Inventors: Il Young Jeong, Suwon-si (KR); Gyoo Wan Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 721 days.

(21) Appl. No.: 15/798,849

(22) Filed: Oct. 31, 2017

(65) Prior Publication Data

US 2018/0154482 A1 Jun. 7, 2018

(30) Foreign Application Priority Data

Dec. 5, 2016 (KR) .................. 10-2016-0164349

(51) Int. Cl.
*B23K 26/067* (2006.01)
*B23K 26/06* (2014.01)

(52) U.S. Cl.
CPC ...... *B23K 26/0673* (2013.01); *B23K 26/0608* (2013.01); *B23K 26/0643* (2013.01); *B23K 26/0648* (2013.01); *B23K 26/0652* (2013.01); *B23K 26/0665* (2013.01)

(58) Field of Classification Search
CPC ............ B23K 26/0643; B23K 26/0608; B23K 26/0652; B23K 26/0665; B23K 26/0673; B23K 26/067; B23K 26/083; B23K 26/0869; B23K 26/364; B23K 2201/36; B23K 2203/54
See application file for complete search history.

(56) References Cited

U.S. PATENT DOCUMENTS

| 2003/0019854 A1* | 1/2003 | Gross ................... H05K 3/0026 219/121.73 |
| 2005/0279736 A1* | 12/2005 | Bruland ............. B23K 26/0613 219/121.8 |
| 2006/0065640 A1* | 3/2006 | Lizotte ............... B23K 26/0622 219/121.61 |
| 2013/0140288 A1* | 6/2013 | Yu ........................ B23K 26/354 219/121.78 |

FOREIGN PATENT DOCUMENTS

| KR | 10-0709171 B1 | 4/2007 |
| KR | 10-2011-0062884 A | 6/2011 |
| KR | 10-2014-0096219 A | 8/2014 |

* cited by examiner

*Primary Examiner* — Dana Ross
*Assistant Examiner* — Joe E Mills, Jr.
(74) *Attorney, Agent, or Firm* — Lewis Roca Rothgerber Christie LLP

(57) ABSTRACT

A laser processing apparatus includes: a scanner configured to adjust a path of at least one of a first laser beam and a second laser beam; and a lens unit configured to condense the first laser beam and the second laser beam received from the scanner. The scanner may include a first reflection member for providing the first laser beam to the lens unit and a second reflection member for providing the second laser beam to the first reflection member.

20 Claims, 14 Drawing Sheets

LASER PROCESSING APPARATUS

CROSS-REFERENCE TO RELATED APPLICATION

This application claims priority to and the benefit of Korean Patent Application No. 10-2016-0164349, filed on Dec. 5, 2016 in the Korean Intellectual Property Office, the entire content of which is incorporated herein by reference.

BACKGROUND

1. Field

Aspects of embodiments of the present disclosure relate to a laser processing apparatus.

2. Description of the Related Art

Laser processing refers to a method of performing processing at a high energy density by concentrating a laser beam at one point. A laser processing apparatus refers to an apparatus that performs processing, such as cutting, patterning, and welding of materials, using a laser beam.

A laser beam used in laser processing has high directivity and high density. Particularly, a high power laser can be used for processing of display panels because it does not affect the surroundings and enables precise processing.

SUMMARY

According to an aspect of embodiments of the present disclosure, a laser processing apparatus is capable of dividing one laser beam into at least two laser beams and adjusting a path of each of the divided laser beams.

According to one or more embodiments of the present disclosure, one laser beam may be divided into at least two laser beams and a path of each of the divided laser beams may be adjusted.

According to another aspect of embodiments of the present disclosure, the output intensity of each of the divided laser beams can be set differently.

According to one or more exemplary embodiments of the present invention, a laser processing apparatus comprises: a scanner configured to adjust a path of at least one of a first laser beam and a second laser beam; and a lens unit configured to condense the first laser beam and the second laser beam received from the scanner. The scanner may include a first reflection member for providing the first laser beam to the lens unit and a second reflection member for providing the second laser beam to the first reflection member.

According to one or more exemplary embodiments of the present invention, a laser processing apparatus comprises: a laser beam generator configured to emit a laser beam; a beam splitter configured to split the laser beam into a first laser beam and a second laser beam; and a scanner including a first reflection member configured to receive the first laser beam and adjust a path of the first laser beam, and a second reflection member configured to receive the second laser beam, adjust a path of the second laser beam, and provide the second laser beam to the first reflection member.

BRIEF DESCRIPTION OF THE DRAWINGS

The above and other aspects and features of the present disclosure will become more apparent by describing in further detail some exemplary embodiments thereof with reference to the attached drawings, in which.

DETAILED DESCRIPTION

Figure 1:
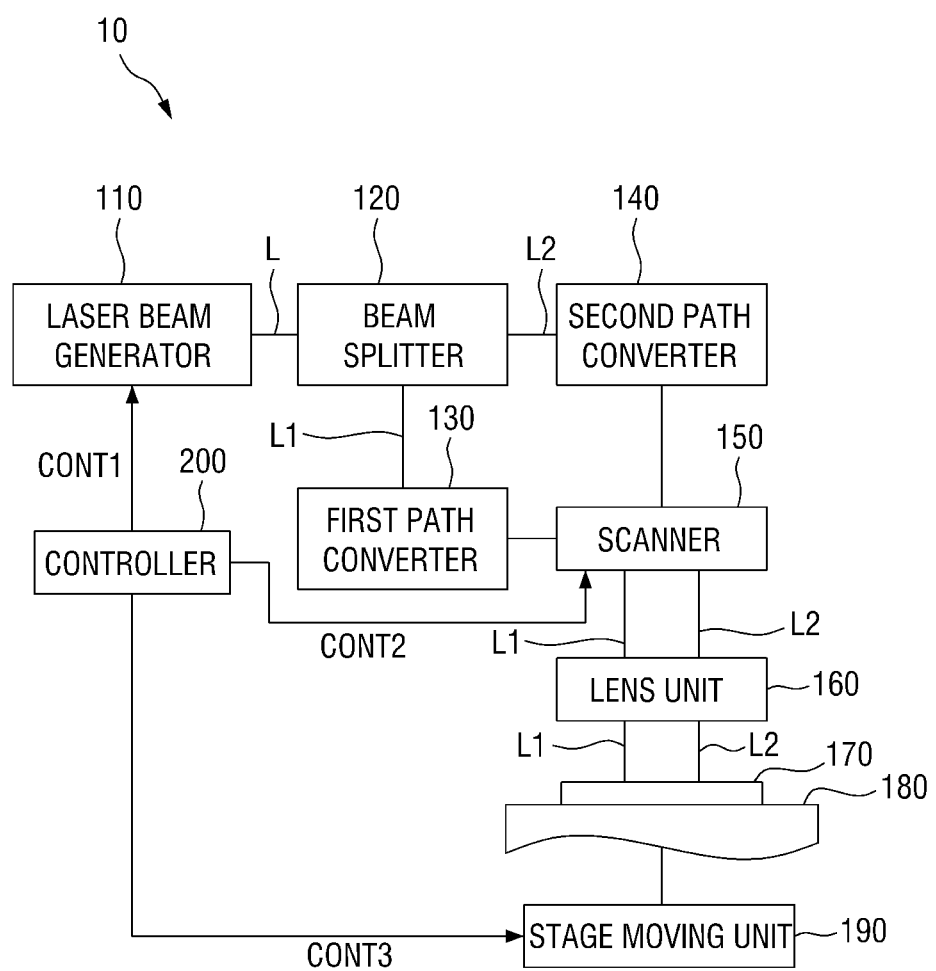
FIG. 1 is a block diagram schematically showing a laser processing apparatus according to an embodiment of the present disclosure.

In the following description, for the purpose of explanation, numerous details are set forth in order to provide a thorough understanding of various exemplary embodiments. It will be apparent, however, that various exemplary embodiments may be practiced without these specific details or with one or more equivalent arrangements. In some instances, well-known structures and devices may be shown in block diagram form in order to avoid unnecessarily obscuring various exemplary embodiments.

In the accompanying drawing figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or one or more intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections are not be limited by these terms. These terms are used to distinguish one element, component, region, layer, and/or section from another element, component, region, layer, and/or section. Thus, a "first" element, component, region, layer, and/or section described below could be termed a "second" element, component, region, layer, and/or section without departing from the teachings of the present disclosure.

Spatially relative terms, such as "beneath," "below," "lower," "above," "upper," and the like, may be used herein for descriptive purposes, and to describe one element or feature's relationship to another element(s) or feature(s) as illustrated in the drawings. However, spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein are to be interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments may be described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle may, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and are not to be interpreted in an idealized or overly formal sense, unless expressly so defined herein.

Herein, some exemplary embodiments will be described with reference to the accompanying drawings.

FIG. 1 is a block diagram schematically showing a laser processing apparatus according to an embodiment of the present disclosure.

A laser processing apparatus 10 according to an embodiment of the present disclosure may include a laser beam generator 110, a beam splitter 120, a first path converter 130, a second path converter 140, a scanner 150, and a lens unit 160.

The laser beam generator 110 emits a laser beam L to the beam splitter 120. The laser beam generator 110 may emit the laser beam L continuously or discontinuously. Here, the laser beam L may be a single beam or multiple beams. Herein, a case in which the laser beam L is a single beam will be described as an example.

The beam splitter 120 may split the laser beam L provided from the laser beam generator 110 into at least two laser beams. In an embodiment, the beam splitter 120 may divide the laser beam L into a first laser beam L1 and a second laser beam L2. The beam splitter 120 may provide the first laser beam L1 to the first path converter 130 and may provide the second laser beam L2 to the second path converter 140.

The first path converter 130 may convert a path of the first laser beam L1 and provide the first laser beam L1 to the scanner 150. To this end, the first path converter 130 may be disposed on the path of the first laser beam L1. The second path converter 140 may convert a path of the second laser beam L2 and provide the second laser beam L2 to the scanner 150. To this end, the second path converter 140 may be disposed on the path of the second laser beam L2.

The scanner 150 may adjust a directional path of at least one of the first laser beam L1 and the second laser beam L2 to be incident on the scanner 150, such that at least one of the first laser beam L1 and the second laser beam L2 can be provided at a desired position on a target object 170 to be processed.

The lens unit 160 may be disposed between the target object 170 and the scanner 150. The lens unit 160 may condense the first laser beam L1 and the second laser beam L2 received from the scanner 150 onto the target object 170.

The target object 170 may include a substrate, such as glass or the like, in an embodiment. The target object 170 may be seated on a stage 180. In an embodiment, the stage 180 may be moved in a direction (e.g., a predetermined direction) by a stage moving unit 190.

The laser processing apparatus 10 according to an embodiment of the present disclosure may further include a controller 200. In an embodiment, the controller 200 may control the overall operation of the laser beam generator 110, the scanner 150, and the stage moving unit 190.

In an embodiment, the laser beam generator 110 may receive a first control signal CONT1 and adjust an output, shape, or wavelength of the laser beam L. The scanner 150 may receive a second control signal CONT2 and adjust a directional path of at least one of the first laser beam L1 and the second laser beam L2. In an embodiment, the stage moving unit 190 may receive a third control signal CONT3 and transfer the target object 170 in a designated direction.

Figure 2:
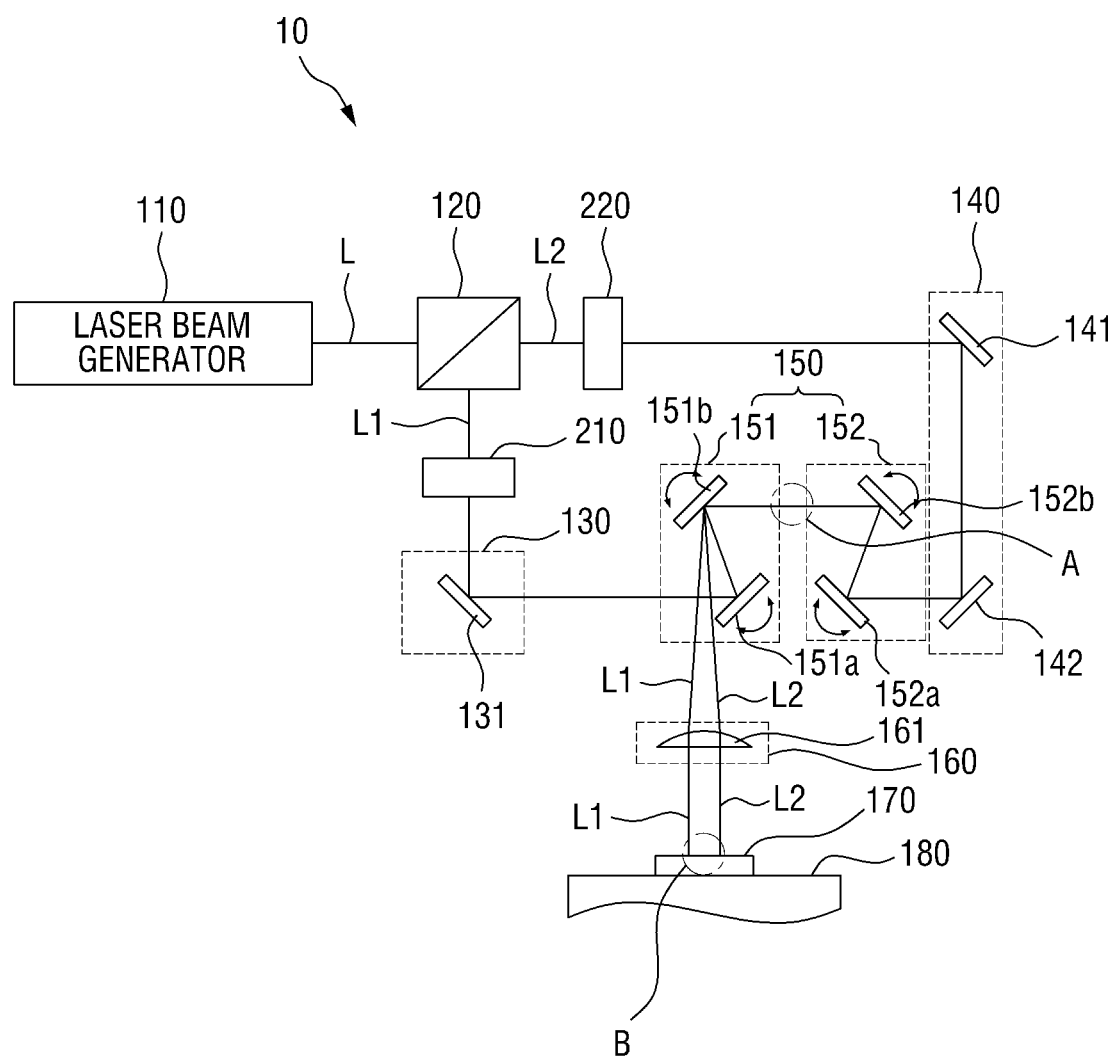
FIG. 2 is a diagram specifically showing an embodiment of the laser processing apparatus shown in FIG. 1.

FIG. 2 is a diagram showing an embodiment of the laser processing apparatus shown in FIG. 1. The laser processing apparatus according to an embodiment of the present disclosure will be described in further detail with reference to FIG. 2. However, a repeated description similar to the description provided with reference to FIG. 1 will be omitted.

The beam splitter 120 may split the laser beam L into the first laser beam L1 and the second laser beam L2. A laser beam splitting method of the beam splitter 120 is not particularly limited. For example, in one embodiment, the beam splitter 120 may split the laser beam L through a prism. In another embodiment, the beam splitter 120 may include a wave plate and a polarizer to change a polarization state of the laser beam L. The beam splitter 120 may further include a reflection mirror for providing the split first laser beam L1 to the first path converter 130 or providing the split second laser beam L2 to the second path converter 140.

The first path converter 130 may include a first reflection mirror 131. The first reflection mirror 131 may provide the first laser beam L1 to the scanner 150. In an embodiment, the first reflection mirror 131 may have an inclination of about 45 degrees. In an embodiment, the scanner 150 may be arranged to be perpendicular to an optical axis of the first laser beam L1.

In an embodiment, the second path converter 140 may include a second reflection mirror 141 and a third reflection mirror 142. The second reflection mirror 141 and the third reflection mirror 142 may provide the second laser beam L2 to the scanner 150. In an embodiment, the second reflection mirror 141 and the third reflection mirror 142 may have an inclination of 45 degrees.

However, although it is illustrated in FIG. 2 that the first path converter 130 has one reflection mirror and the second path converter 140 has two reflection mirrors, the present disclosure is not limited thereto. That is, the number of the reflection mirrors may vary depending on the optical axis of the incident laser beam and the position of the scanner 150.

In an embodiment, a first output controller 210 may be disposed on the path between the beam splitter 120 and the first path converter 130. Further, a second output controller 220 may be disposed on the path between the beam splitter 120 and the second path converter 140. The first output controller 210 may control the output intensity of the first laser beam L1. The second output controller 220 may control the output intensity of the second laser beam L2. The first output controller 210 and the second output controller 220 may be controlled by the controller 200 in one embodiment.

In an embodiment, the output of the first laser beam L1 may be set to be higher than the output of the second laser beam L2, and the first laser beam L1 may be used as a processing laser beam for processing the target object 170, and the second laser beam L2 may be used as a particle removing laser beam for cleaning or removing particles generated by processing of the first laser beam L1.

However, the arrangement positions of the first output controller 210 and the second output controller 220 are not limited to those shown in FIG. 2. That is, the position of the first output controller 210 is not particularly limited as long as it is on the path of the first laser beam L1, and the position of the second output controller 220 is not particularly limited as long as it is on the path of the second laser beam L2.

The scanner 150 may include a first mirror unit 151 and a second mirror unit 152.

In an embodiment, the first mirror unit 151 may include a first galvanometer mirror 151a and a second galvanometer mirror 151b. Each of the first galvanometer mirror 151a and the second galvanometer mirror 151b may have an angle (e.g., a predetermined angle). The first mirror unit 151 may change an angle of at least one of the first galvanometer mirror 151a and the second galvanometer mirror 151b such that the first laser beam L1 can be irradiated to a desired position on the target object 170.

The first mirror unit 151 may change the angle of at least one of the first galvanometer mirror 151a and the second galvanometer mirror 151b based on the second control signal CONT2 (see FIG. 1) provided from the controller 200 (see FIG. 1).

In an embodiment, the second mirror unit 152 may include a third galvanometer mirror 152a and a fourth galvanometer mirror 152b. Each of the third galvanometer mirror 152a and the fourth galvanometer mirror 152b may have an angle (e.g., a predetermined angle). The second mirror unit 152 may change an angle of at least one of the third galvanometer mirror 152a and the fourth galvanometer mirror 152b such that the second laser beam L2 can be irradiated to a desired position on the target object 170.

The second mirror unit 152 may change the angle of at least one of the third galvanometer mirror 152a and the fourth galvanometer mirror 152b based on the second control signal CONT2 provided from the controller 200.

The first mirror unit 151 according to an embodiment will be described in more detail.

The first galvanometer mirror 151a may be disposed such that its reflective surface faces a reflective surface of the second galvanometer mirror 151b. Accordingly, the first laser beam L1 incident on the first galvanometer mirror 151a can be incident on the reflective surface of the second galvanometer mirror 151b. The first galvanometer mirror 151a may be rotated to have a plurality of rotation angles. For example, the first galvanometer mirror 151a may be rotated to have a first slope and a second slope different from the first slope on a plane. If a virtual straight line having an average slope of the first slope and the second slope is defined as a first reference line, the first slope has an angle of θ in a counterclockwise direction with respect to the first reference line, and the second slope has an angle of θ in a clockwise direction with respect to the first reference line. An angle between the first slope and the second slope becomes 2θ.

An incidence angle of the first laser beam L1 incident on the first galvanometer mirror 151a varies depending on the inclination of the first galvanometer mirror 151a. For example, assuming that the first laser beam L1 has an incidence angle of 45 degrees with respect to the first reference line, when the first galvanometer mirror 151a has the first slope, the incidence angle of the first laser beam L1 may be 45 degrees +θ. Accordingly, the first laser beam L1 may be refracted and emitted to have a reflection angle of 45 degrees +θ. If the laser beam emitted at a reflection angle of 45 degrees is defined as a reference laser beam, the first laser beam L1 emitted at a reflection angle of 45 degrees +θ may have a path separated from the reference laser beam by a distance (e.g., a predetermined distance).

The second galvanometer mirror 151b may adjust the path of the first laser beam L1 emitted from the first galvanometer mirror 151a and provide it to the target object 170. The second galvanometer mirror 151b may be rotated to have a plurality of rotation angles. For example, the second galvanometer mirror 151b may be rotated to have a third slope and a fourth slope different from the third slope on a plane. If a virtual straight line having an average slope of the third slope and the fourth slope is defined as a second reference line, the third slope has an angle of θ in a counterclockwise direction with respect to the second reference line, and the fourth slope has an angle of θ in a clockwise direction with respect to the second reference line. An angle between the third slope and the fourth slope becomes 2θ.

An incidence angle of the first laser beam L1 incident on the second galvanometer mirror 151b varies depending on the inclination of the second galvanometer mirror 151b. For example, assuming that the first laser beam L1 has an incidence angle of 45 degrees with respect to the second reference line, when the second galvanometer mirror 151b has the third slope, the incidence angle of the first laser beam L1 may be 45 degrees +θ. Accordingly, the first laser beam L1 may be refracted and emitted to have a reflection angle of 45 degrees +θ. If the laser beam emitted at a reflection angle of 45 degrees is defined as a reference laser beam, the first laser beam L1 emitted at a reflection angle of 45 degrees +θ may have a path separated from the reference laser beam by a predetermined distance.

Here, the first galvanometer mirror 151a may separate the path of the first laser beam L1 from the reference laser beam in a first direction, and the second galvanometer mirror 151b may separate the path of the first laser beam L1 from the reference laser beam in a second direction different from the first direction. In one embodiment, the first direction may intersect the second direction.

The second mirror unit 152 may convert the path of the second laser beam L2 and provide it to the first mirror unit 151. In an embodiment, the second laser beam L2 refracted from the fourth galvanometer mirror 152b may be provided to the second galvanometer mirror 151b of the first mirror unit 151.

The second galvanometer mirror 151b may receive both the first laser beam L1 emitted from the first galvanometer mirror 151a and the second laser beam L2 emitted from the fourth galvanometer mirror 152b, adjust the paths thereof, and provide them to the target object 170. That is, a region irradiated with the first laser beam L1 may be changed according to the adjustment of the path of at least one of the first galvanometer mirror 151a and the second galvanometer mirror 151b. Further, a region irradiated with the second laser beam L2 may be changed according to the adjustment of the path of at least one of the second galvanometer mirror 151b, the third galvanometer mirror 152a, and the fourth galvanometer mirror 152b. A more detailed description will be made in terms of the region irradiated with the second laser beam L2 as an example.

Figure 3A:
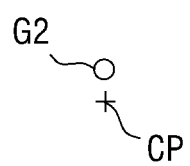
FIGS. 3A, 3B, and 3C are enlarged views of a region "A" shown in FIG. 2 illustrating cross sections of a second laser beam.
Figure 3B:
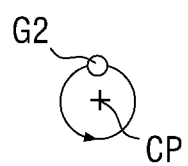
Figure 3C:
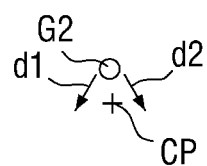

FIGS. 3A, 3B, and 3C are enlarged views of a region "A" shown in FIG. 2 illustrating cross sections of the second laser beam L2. Here, reference symbol G2 denotes a cross section of the second laser beam L2, and reference symbol CP denotes a virtual center point.

Referring to FIG. 3A, the second laser beam L2 may be irradiated onto the region G2 separated from the center point CP by a distance (e.g., a predetermined distance). A distance between the second laser beam L2 and the center point CP may be adjusted in the scanner 150, the beam splitter 120, or the like.

Referring to FIG. 3B, the second laser beam L2 may be rotated along a circle around the center point CP with respect to the center point CP. Here, the size and shape of the circle are not limited to those shown in FIG. 3B. Also, the direction of rotation of the second laser beam L2 may be opposite to that shown in FIG. 3B.

Referring to FIG. 3C, the second laser beam L2 may be irradiated so as to be separated from the center point CP by a distance (e.g., a predetermined distance), and move in a first direction d1 or a second direction d2. Here, the second laser beam L2 does not necessarily have to move in a straight line, but may also move with a curvature (e.g., a predetermined curvature).

However, the present disclosure is not limited to the examples shown in FIGS. 3A to 3C, and the region irradiated with the second laser beam L2 may vary depending on the adjustment of the path of at least one of the third galvanometer mirror 152a and the fourth galvanometer mirror 152b. Although it is illustrated in FIGS. 3A to 3C that the cross section G2 of the second laser beam L2 is circular, the present disclosure is not limited thereto.

In an embodiment, the lens unit 160 may include at least one condensing lens 161. Herein, a case in which the lens unit 160 has one condensing lens 161 will be described as an example.

The condensing lens 161 may condense at least one of the first laser beam L1 and the second laser beam L2 onto the target object 170. The condensing lens 161 may be a telecentric lens in one embodiment. A focal length of the condensing lens 161 may be determined in consideration of a plurality of galvanometer mirrors included in the scanner 150, the target object 170, and the like.

The first laser beam L1 and the second laser beam L2 condensed by the condensing lens 161 may be provided to the target object 170 on the stage 180.

Figure 4A:
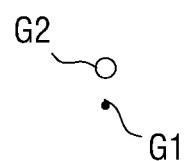
FIGS. 4A, 4B, and 4C are enlarged views of a region "B" shown in FIG. 2 illustrating cross sections of a first laser beam and a second laser beam.
Figure 4B:
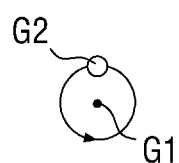
Figure 4C:
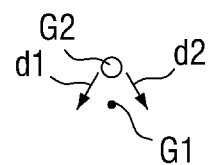

FIGS. 4A, 4B, and 4C are enlarged views of a region "B" shown in FIG. 2 illustrating cross sections of the first laser beam L1 and the second laser beam L2. Here, reference symbol G1 denotes a cross section of the first laser beam L1, and reference symbol G2 denotes a cross section of the second laser beam L2.

The first laser beam L1 and the second laser beam L2 may be irradiated on the target object 170 while being separated from each other by a distance (e.g., a predetermined distance) in one embodiment. In another embodiment, the first laser beam L1 and the second laser beam L2 may be irradiated onto the same region on the target object 170. Herein, a case in which the first laser beam L1 and the second laser beam L2 are irradiated to be separate from each other will be described as an example.

Referring to FIG. 4A, the second laser beam L2 may be irradiated so as to be separated from the first laser beam L1 by a distance (e.g., a predetermined distance). The separation distance between the first laser beam L1 and the second laser beam L2 may be adjusted in the scanner 150, the beam splitter 120, or the like.

Referring to FIG. 4B, the second laser beam L2 may be rotated along a circle around the first laser beam L1 with respect to the first laser beam L1. Here, the size and shape of the circle are not limited to those shown in FIG. 4B. Further, the direction of rotation of the second laser beam L2 may be opposite to that shown in FIG. 4B.

Referring to FIG. 4C, the second laser beam L2 may move in the first direction d1 or the second direction d2 while being irradiated to be separated from the first laser beam L1 by a distance (e.g., a predetermined distance). Here, the second laser beam L2 does not necessarily have to move in a straight line, but may move with a curvature (e.g., a predetermined curvature).

However, the present disclosure is not limited to the examples shown in FIGS. 4A to 4C, and the irradiation positions and shapes of the first laser beam L1 and the second laser beam L2 may vary depending on the adjustment of the path of at least one of the first to fourth galvanometer mirrors 151a, 151b, 152a, and 152b. Although a case in which the second laser beam L2 moves with respect to the first laser beam L1 has been described with reference to FIGS. 4A to 4C, in another embodiment, the first laser beam L1 may move with respect to the second laser beam L2.

Although it is illustrated in FIGS. 4A to 4C that the cross section G1 of the first laser beam L1 and the cross section G2 of the second laser beam L2 have different areas, this is for convenience of explanation and illustration, and, in one or more embodiments, they may have the same area or shape.

The laser processing apparatus 10 according to an embodiment of the present disclosure provides the first laser beam L1 and the second laser beam L2 to the target object 170, such that the number of laser beams irradiated per unit area of the target object 170 can be increased. Further, the positions of the first laser beam L1 and the second laser beam L2 irradiated on the target object 170 can be individually adjusted by using the scanner 150. Thus, the processing efficiency can be improved.

FIGS. 5A to 7B are views showing irradiation patterns of the laser beam and cross sections of the target object according to the respective irradiation patterns. A case in which a region irradiated with a laser beam is moved along a predetermined direction Y1 will be described as an example with reference to FIGS. 5A to 7B.

Figure 5A:
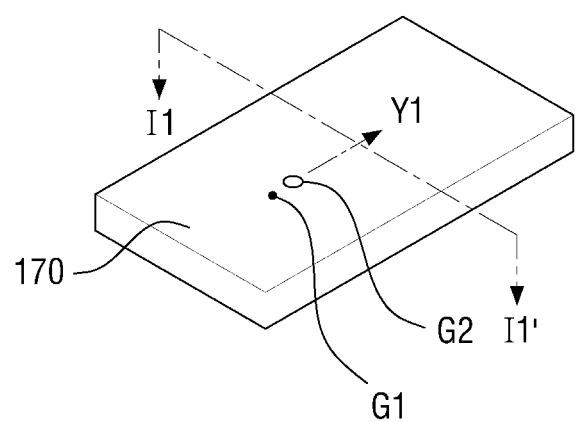
FIGS. 5A and 5B are, respectively, a schematic view showing an irradiation pattern of a laser beam, and a schematic cross-sectional view of a target object according to the irradiation pattern, taken along the line I1-I1' of FIG. 5A.
Figure 5B:
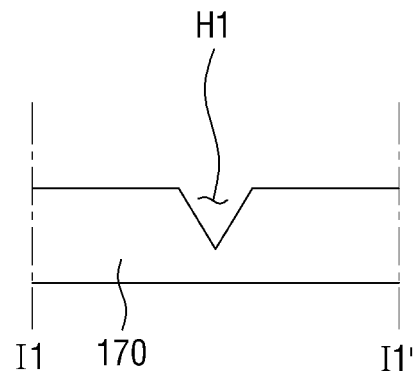

In an embodiment, referring to FIGS. 5A and 5B, the second laser beam L2 may be irradiated on the target object 170 so as to be separated from the first laser beam L1 by a distance (e.g., a predetermined distance). In the target object 170, a pattern having a first shape H1 in cross section may be formed.

Figure 6A:
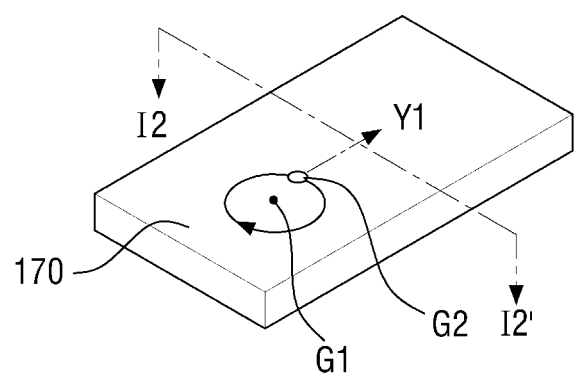
FIGS. 6A and 6B are, respectively, a schematic view showing an irradiation pattern of a laser beam, and a schematic cross-sectional view of a target object according to the irradiation pattern, taken along the line I2-I2' of FIG. 6A.
Figure 6B:
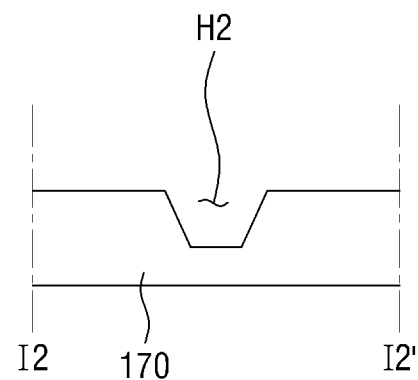

In another embodiment, referring to FIGS. 6A and 6B, the second laser beam L2 may be rotated along a circle around the first laser beam L1 with respect to the first laser beam L1. In the target object 170, a pattern having a second shape H2 in cross section may be formed.

Figure 7A:
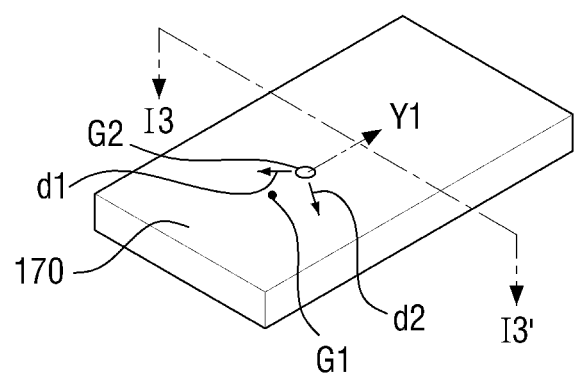
FIGS. 7A and 7B are, respectively, a schematic view showing an irradiation pattern of a laser beam, and a schematic cross-sectional view of a target object according to the irradiation pattern, taken along the line I3-I3' of FIG. 7A.
Figure 7B:
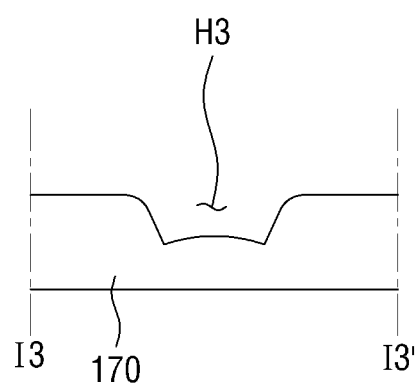

In another embodiment, referring to FIGS. 7A and 7B, the second laser beam L2 may be irradiated so as to be separated from the first laser beam L1 by a distance (e.g., a predetermined distance), and move in the first direction d1 or the second direction d2. In the target object 170, a pattern having a third shape H3 in cross section may be formed.

However, the present disclosure is not limited to the cross-sectional shapes shown in FIGS. 5A to 7B, but may be different depending on the output intensity of the first and second laser beams L1 and L2, the distance between the first and second laser beams L1 and L2, and the like.

Figure 8:
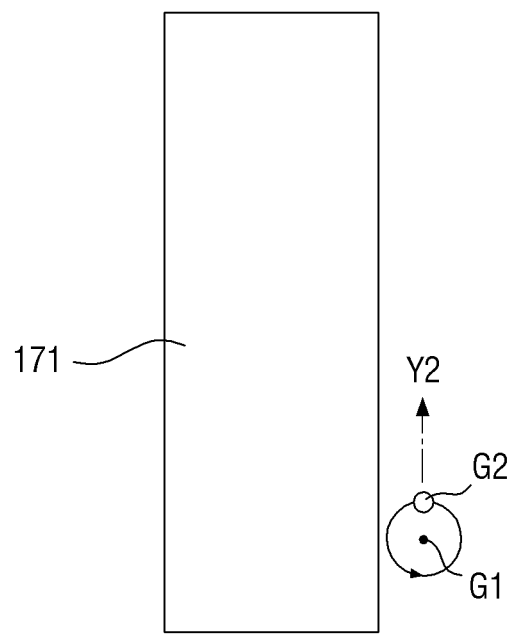
FIG. 8 is a view showing processing of glass using a laser processing apparatus according to an embodiment of the present disclosure.

FIG. 8 is a view showing processing of glass using a laser processing apparatus according to an embodiment of the present disclosure. Reference symbol G1 denotes the cross section of the first laser beam L1, and reference symbol G2 denotes the cross section of the second laser beam L2.

The laser processing apparatus 10 according to an embodiment of the present disclosure may provide the first laser beam L1 and the second laser beam L2 to glass 171 while moving the first laser beam L1 and the second laser beam L2 in a predetermined direction or path Y2. In an embodiment, the second laser beam L2 may be rotated along a circle around the first laser beam L1 with respect to the first laser beam L1. Here, the output intensity of the first laser beam L1 may be greater than the output intensity of the second laser beam L2. Thus, the laser processing apparatus 10 according to an embodiment of the present disclosure may be configured such that the glass 171 can be cut using the first laser beam L1 and the surface of the cut glass 171 can be evenly formed using the second laser beam L2.

If glass is processed by a conventional method, a cut surface is uneven due to the fragile property of glass. Thus, an additional process may be required to even out the cut surface. By contrast, the laser processing apparatus according to the embodiment of the present disclosure shown in FIG. 8 can evenly process the surface of the cut glass. In addition, there may be no need for a separate additional process to even out the cut surface.

Figure 9:
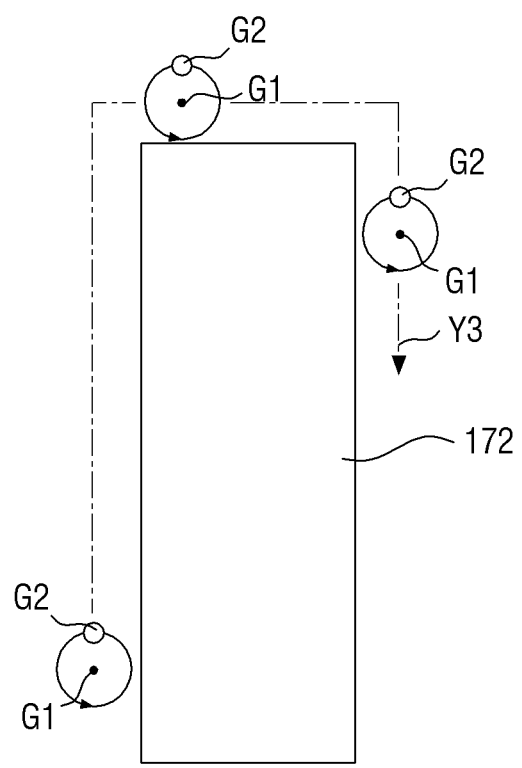
FIG. 9 is a view showing processing of a substrate using a laser processing apparatus according to an embodiment of the present disclosure.

FIG. 9 is a view showing processing of a substrate using a laser processing apparatus according to an embodiment of the present disclosure. Here, a substrate 172 may be a substrate used in a display device, for example, in one embodiment.

Referring to FIG. 9, the laser processing apparatus 10 (e.g., a laser machining apparatus) according to an embodiment of the present disclosure may provide the first laser beam L1 and the second laser beam L2 to the substrate 172 while moving the first laser beam L1 and the second laser beam L2 in a predetermined direction or path Y3. In an embodiment, the second laser beam L2 may be rotated along a circle around the first laser beam L1 with respect to the first laser beam L1. Here, the output intensity of the first laser beam L1 may be greater than the output intensity of the second laser beam L2. Thus, the laser processing apparatus 10 according to an embodiment of the present disclosure may be configured such that a depth processability at the time of processing the substrate 172 can be increased by using the first laser beam L1 having a larger output intensity, and the cut surface of the substrate 172 can be evenly formed using the second laser beam L2. Also, the size of a heat affect zone can be minimized or reduced, and the substrate 172 can be processed more precisely.

Figure 10:
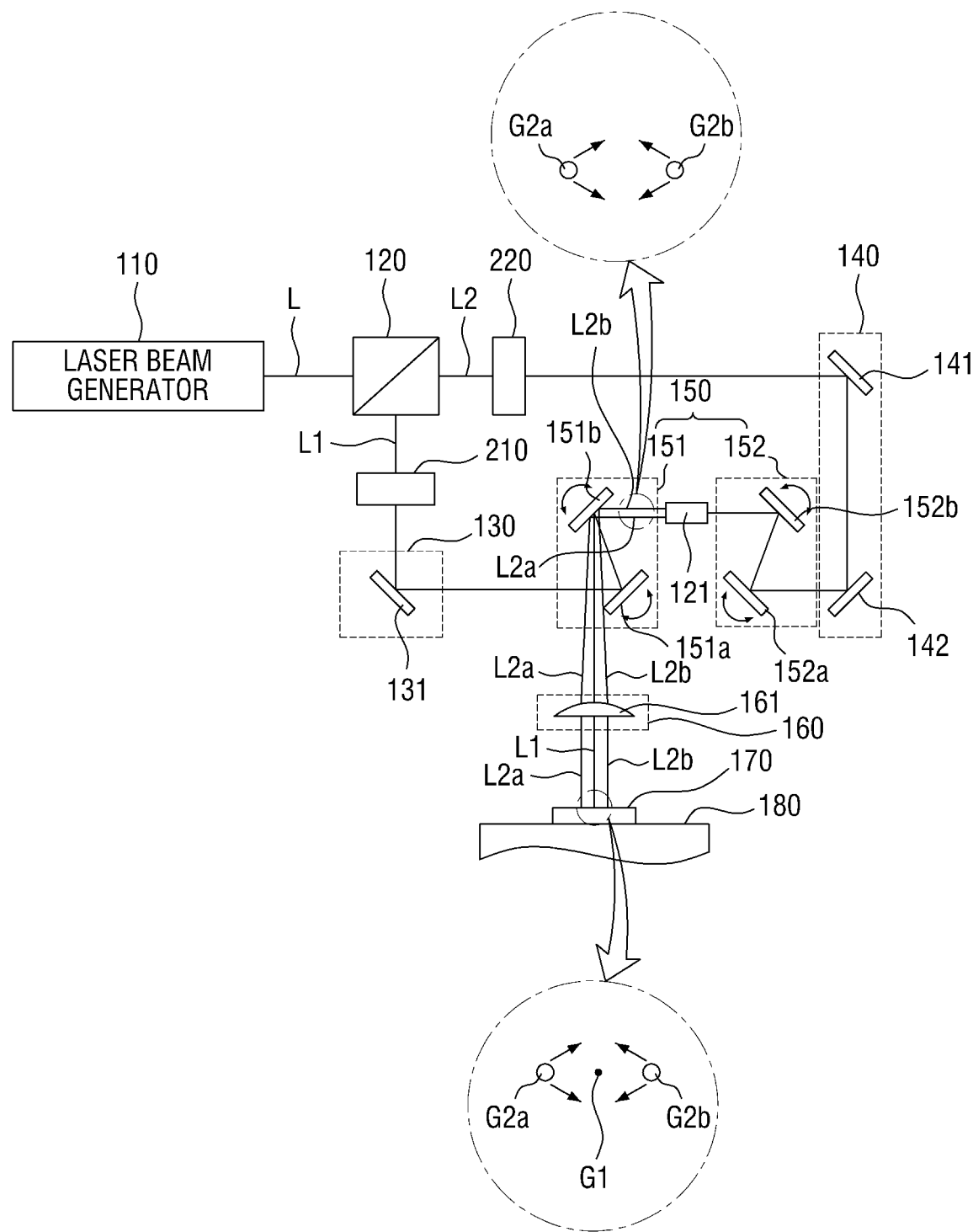
FIG. 10 is a diagram showing a laser processing apparatus according to another embodiment of the present disclosure.

FIG. 10 is a diagram showing a laser processing apparatus according to another embodiment of the present disclosure.

The laser processing apparatus according to another embodiment of the present disclosure may further include a sub-beam splitter 121. The sub-beam splitter 121 may be disposed on the path of the second laser beam L2. In one embodiment, the sub-beam splitter 121 may be disposed between the fourth galvanometer mirror 152b and the second galvanometer mirror 151b in the path of the second laser beam L2. Accordingly, the sub-beam splitter 121 may split the second laser beam L2 reflected from the fourth galvanometer mirror 152b into two sub-laser beams. That is, the sub-beam splitter 121 may split the second laser beam L2 into a first sub-laser beam L2a and a second sub-laser beam L2b. The first sub-laser beam L2a and the second sub-laser beam L2b may be adjusted in position by the second galvanometer mirror 151b and provided to the target object 170. In one embodiment, for example, the sub-beam splitter 121 may split the second laser beam L2 through a prism. In another embodiment, for example, the sub-beam splitter 121 may split the second laser beam L2 using a wave plate and a polarizer which change the polarization state of the second laser beam L2.

In an embodiment, the sub-beam splitter 121 may further include a reflection mirror for providing the first sub-laser beam L2*a* and the second sub-laser beam L2*b* to the second galvanometer mirror 151*b*.

Figure 11A:
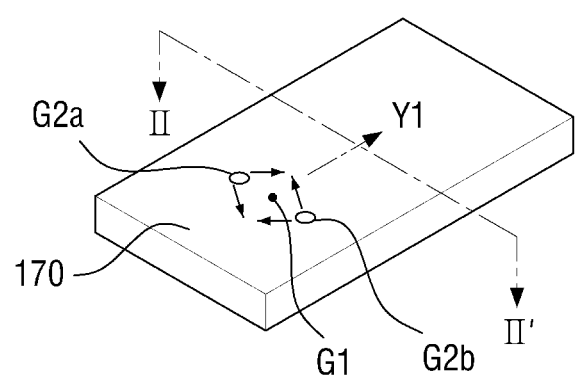
FIGS. 11A and 11B are, respectively, a schematic view showing an irradiation pattern of the laser beam in the laser processing apparatus shown in FIG. 10 and a schematic cross-sectional view of a target object according to the irradiation pattern, taken along the line II-II' of FIG. 11A.
Figure 11B:
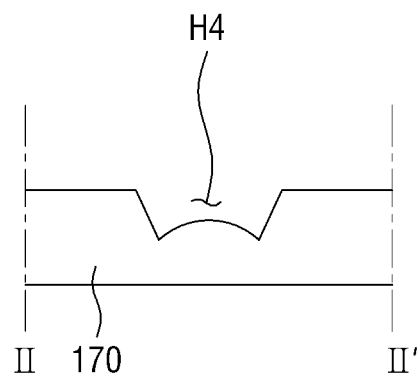

FIG. 11A is a schematic view showing an irradiation pattern of the laser beam in the laser processing apparatus shown in FIG. 10; and FIG. 11B is a schematic cross-sectional view of the target object according to the irradiation pattern shown in FIG. 11A. Reference symbol G1 denotes the cross section of the first laser beam L1, reference symbol G2*a* denotes a cross section of the first sub-laser beam L2*a*, and reference symbol G2*b* denotes a cross section of the second sub-laser beam L2*b*.

In an embodiment, referring to FIGS. 11A and 11B, the first sub-laser beam L2*a* may be irradiated to one side of the first laser beam L1. The second sub-laser beam L2*b* may be irradiated to the other side opposite to the one side of the first laser beam L1. That is, the first laser beam L1 may be irradiated on the target object 170 so as to be positioned between the first sub-laser beam L2*a* and the second sub-laser beam L2*b*. The first sub-laser beam L2*a* and the second sub-laser beam L2*b* may move in the predetermined direction Y1. Accordingly, a pattern having a fourth shape H4 (see FIG. 11B) in cross section may be formed in the target object 170.

However, the present disclosure is not limited to the cross-sectional shape shown in FIGS. 11A and 11B, but may be different depending on the output intensities of the first laser beam L1, the first sub-laser beam L2*a*, and the second sub-laser beam L2*b*, the distance between the laser beams, and the like.

Figure 12:
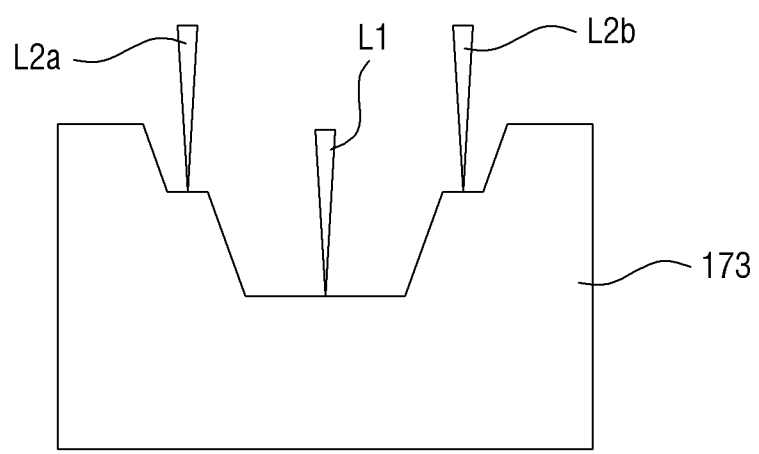
FIG. 12 is a view showing processing of a substrate by using the laser processing apparatus shown in FIG. 10.

FIG. 12 is a view showing processing of a substrate by using the laser processing apparatus shown in FIG. 10.

Referring to FIG. 12, the output intensity of the first laser beam L1 may be greater than the output intensity of the first sub-laser beam L2*a* and the second sub-laser beam L2*b*. Further, in an embodiment, the output intensity of the first sub-laser beam L2*a* may be equal to the output intensity of the second sub-laser beam L2*b*. Thus, a pattern having a cross section with different heights may be formed in a substrate 173. However, the present disclosure is not limited to the cross-sectional shape shown in FIG. 12, but may be different depending on the output intensities of the first laser beam L1, the first sub-laser beam L2*a*, and the second sub-laser beam L2*b*, the distance between the laser beams, and the like.

Figure 13:
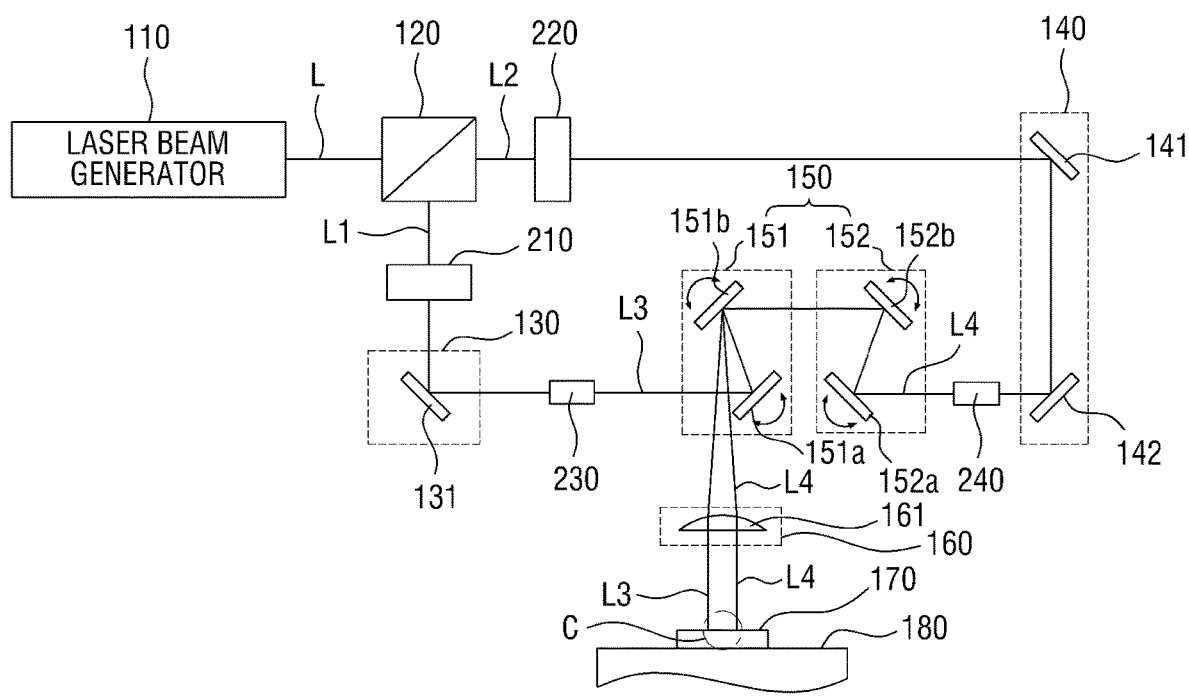
FIG. 13 shows a laser processing apparatus according to another embodiment of the present disclosure.

FIG. 13 shows a laser processing apparatus according to another embodiment of the present disclosure and an irradiation pattern of the laser beam. Here, reference symbol G3 denotes a cross section of a third laser beam L3, and reference symbol G4 denotes a cross section of a fourth laser beam L4.

Referring to FIG. 13, the laser processing apparatus according to another embodiment of the present disclosure may further include a first spectroscopic unit 230 and a second spectroscopic unit 240.

The first spectroscopic unit 230 may be disposed on the path of the first laser beam L1. In an embodiment, the first spectroscopic unit 230 may be disposed between the first reflection mirror 131 and the first galvanometer mirror 151*a*. The first spectroscopic unit 230 may divide the first laser beam L1 into a plurality of laser beams. The first spectroscopic unit 230 may provide the third laser beam L3 which has been divided into a plurality of laser beams to the first galvanometer mirror 151*a*.

The second spectroscopic unit 240 may be disposed on the path of the second laser beam L2. In an embodiment, the second spectroscopic unit 240 may be disposed between the third reflection mirror 142 and the third galvanometer mirror 152*a*. The second spectroscopic unit 240 may divide the second laser beam L2 into a plurality of laser beams. The second spectroscopic unit 240 may provide the fourth laser beam L4 which has been divided into a plurality of laser beams to the third galvanometer mirror 152*a*.

However, in FIG. 13, each of the third laser beam L3 and the fourth laser beam L4 is represented by a single solid line.

In an embodiment, each of the first spectroscopic unit 230 and the second spectroscopic unit 240 may be a grating optic device using diffraction of light, for example. In an embodiment, at least one of the first and second spectroscopic units 230 and 240 may be omitted.

Figure 14A:
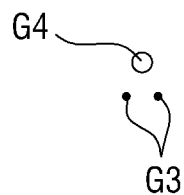
FIGS. 14A, 14B, 14C, and 14D are enlarged views of a region "C" shown in FIG. 13 illustrating irradiation patterns of a laser beam.
Figure 14B:
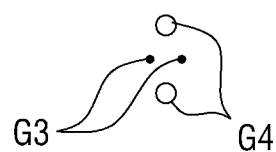
Figure 14C:
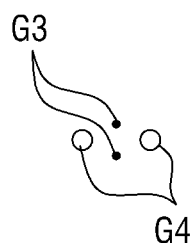
Figure 14D:
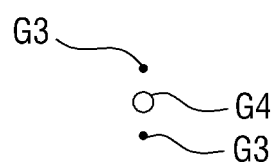

The irradiation patterns of the third laser beam L3 and the fourth laser beam L4 may be formed as shown in FIGS. 14A to 14D. However, the present disclosure is not limited to those shown in FIGS. 14A to 14D, and the irradiation patterns may vary depending on the number of laser beams that are split by the first and second spectroscopic units 230 and 240 and whether the scanner 150, the first spectroscopic unit 230, and the second spectroscopic unit 240 are omitted. In one embodiment, if the second spectroscopic unit 240 is omitted, the fourth laser beam L4 may be represented as one laser beam as shown in FIGS. 14A and 14D.

In another embodiment, although not shown in the drawings, the beam splitter 120 may be omitted when one laser beam generator is further included.

Although certain exemplary embodiments and implementations have been described herein, other embodiments and modifications will be apparent from this description. Accordingly, the present inventive concept is not limited to the presented embodiments but, rather, extends to and includes the broader scope of the presented claims and various obvious modifications and equivalent arrangements.

What is claimed is:

1. A laser processing apparatus comprising:
a scanner configured to adjust a path of at least one of a first laser beam and a second laser beam; and
a lens unit configured to condense the first laser beam and the second laser beam received from the scanner,
wherein the scanner includes a first reflection member comprising a first mirror to provide the first laser beam to the lens unit, the first reflection member being rotatable to change an angle of the first mirror, and a second reflection member comprising a second mirror to provide the second laser beam to the first reflection member, the second reflection member being rotatable to change an angle of the second mirror, and wherein the second mirror is directly adjacent to the first mirror so as to provide the second laser beam directly to the first mirror.

2. The laser processing apparatus of claim 1, further comprising:
a laser beam generator configured to emit a laser beam; and
a beam splitter configured to split the laser beam into the first laser beam and the second laser beam.

3. The laser processing apparatus of claim 2, further comprising:
a first path converter comprising a first reflection mirror located on a path of the first laser beam between the beam splitter and the scanner, and configured to provide the first laser beam to the scanner; and
a second path converter comprising a second reflection mirror located on a path of the second laser beam between the beam splitter and the scanner, and configured to provide the second laser beam to the scanner.

4. The laser processing apparatus of claim 3, further comprising:
a first output controller located on a path of the first laser beam, and configured to adjust an output intensity of the first laser beam between the beam splitter and the first path converter; and
a second output controller located on a path of the second laser beam, and configured to adjust an output intensity of the second laser beam between the beam splitter and the second path converter.

5. The laser processing apparatus of claim 1, wherein each of the first mirror and the second mirror comprises a galvanometer mirror.

6. The laser processing apparatus of claim 1, wherein the scanner further includes a third reflection member comprising a third mirror configured to receive the first laser beam and provide the first laser beam to the first reflection member.

7. The laser processing apparatus of claim 1, wherein the scanner further includes a fourth reflection member comprising a fourth mirror configured to receive the second laser beam and provide the second laser beam to the second reflection member.

8. The laser processing apparatus of claim 1, wherein the lens unit includes at least one telecentric lens.

9. The laser processing apparatus of claim 1, wherein the scanner adjusts an angle of at least one of the first reflection member and the second reflection member to adjust the path of the at least one of the first laser beam and the second laser beam.

10. The laser processing apparatus of claim 1, further comprising:
a first spectroscopic unit located on a path of the first laser beam, and configured to divide the first laser beam into at least two laser beams by diffraction; and
a second spectroscopic unit located on a path of the second laser beam, and configured to divide the second laser beam into at least two laser beams by diffraction.

11. A laser processing apparatus comprising:
a scanner configured to adjust a path of at least one of a first laser beam and a second laser beam; and
a lens unit configured to condense the first laser beam and the second laser beam received from the scanner,
wherein the scanner includes a first reflection member comprising a first mirror to provide the first laser beam to the lens unit, and a second reflection member comprising a second mirror to provide the second laser beam to the first reflection member, and
the laser processing apparatus further comprises a sub-beam splitter located on a path of the second laser beam between the second reflection member and the first reflection member, and configured to divide the second laser beam into at least two laser beams and provide the at least two laser beams to the first reflection member.

12. The laser processing apparatus of claim 1, further comprising a controller configured to adjust an output intensity of the first laser beam to be different from an output intensity of the second laser beam.

13. A laser processing apparatus comprising:
a laser beam generator configured to emit a laser beam;
a beam splitter configured to split the laser beam into a first laser beam and a second laser beam; and
a scanner comprising a first reflection member comprising a first mirror configured to receive the first laser beam and adjust a path of the first laser beam, the first reflection member being rotatable to change an angle of the first mirror, and a second reflection member comprising a second mirror configured to receive the second laser beam, adjust a path of the second laser beam, and provide the second laser beam to the first reflection member, the second reflection member being rotatable to change an angle of the second mirror, and the second mirror being directly adjacent to the first mirror so as to provide the second laser beam directly to the first mirror.

14. The laser processing apparatus of claim 13, further comprising:
a lens unit configured to receive and condense the first laser beam and the second laser beam from the scanner, wherein the lens unit includes at least one telecentric lens.

15. The laser processing apparatus of claim 13, wherein the scanner adjusts an angle of at least one of the first reflection member and the second reflection member to adjust the path of at least one of the first laser beam and the second laser beam.

16. The laser processing apparatus of claim 13,
wherein the scanner further comprises a third reflection member comprising a third mirror configured to receive the first laser beam and provide the first laser beam to the first reflection member, and a fourth reflection member comprising a fourth mirror configured to receive the second laser beam and provide the second laser beam to the second reflection member, and
wherein each of the first to fourth mirrors comprises a galvanometer mirror.

17. The laser processing apparatus of claim 13, further comprising:
a first output controller located on the path of the first laser beam, and configured to adjust an output intensity of the first laser beam between the beam splitter and the scanner; and
a second output controller located on the path of the second laser beam, and configured to adjust an output intensity of the second laser beam between the beam splitter and the scanner.

18. The laser processing apparatus of claim 13, further comprising:
a first path converter comprising a first reflection mirror located on the path of the first laser beam between the beam splitter and the scanner, and configured to provide the first laser beam to the scanner; and
a second path converter comprising a second reflection mirror located on the path of the second laser beam between the beam splitter and the scanner, and configured to provide the second laser beam to the scanner.

19. The laser processing apparatus of claim 13, further comprising:
a first spectroscopic unit located on the path of the first laser beam, and configured to divide the first laser beam into at least two laser beams by diffraction; and
a second spectroscopic unit located on the path of the second laser beam, and configured to divide the second laser beam into at least two laser beams by diffraction.

20. A laser processing apparatus comprising:
a laser beam generator configured to emit a laser beam;
a beam splitter configured to split the laser beam into a first laser beam and a second laser beam;
a scanner comprising a first reflection member comprising a first mirror configured to receive the first laser beam and adjust a path of the first laser beam, and a second reflection member comprising a second mirror configured to receive the second laser beam, adjust a path of the second laser beam, and provide the second laser beam to the first reflection member; and a sub-beam splitter located on the path of the second laser beam between the second reflection member and the first reflection member, and configured to divide the second laser beam into at least two laser beams and provide the at least two laser beams to the first reflection member.

* * * * *